(12) United States Patent
Booij et al.

(10) Patent No.: US 12,196,876 B2
(45) Date of Patent: Jan. 14, 2025

(54) LIKELIHOOD-BASED ACOUSTIC POSITIONING

(71) Applicant: Sonitor Technologies AS, Oslo (NO)

(72) Inventors: Wilfred Edwin Booij, Oslo (NO); Cyril Antille, Oslo (NO); Elad Shabtai, Oslo (NO); Mattheus Franciscus Albertus Ten Veldhuis, Oslo (NO)

(73) Assignee: Sonitor Technologies AS, Oslo (NO)

( * ) Notice: Subject to any disclaimer, the term of this patent is extended or adjusted under 35 U.S.C. 154(b) by 25 days.

(21) Appl. No.: 17/793,438

(22) PCT Filed: Jan. 20, 2021

(86) PCT No.: PCT/EP2021/051213
§ 371 (c)(1),
(2) Date: Jul. 18, 2022

(87) PCT Pub. No.: WO2021/148473
PCT Pub. Date: Jul. 29, 2021

(65) Prior Publication Data
US 2023/0039932 A1    Feb. 9, 2023

(30) Foreign Application Priority Data
Jan. 20, 2020   (GB) .................................... 2000799

(51) Int. Cl.
*G01S 5/26*       (2006.01)
*G01S 5/30*       (2006.01)
(Continued)

(52) U.S. Cl.
CPC  *G01S 5/30* (2013.01); *G01S 5/26* (2013.01); *G01S 11/14* (2013.01); *G01S 5/0027* (2013.01); *G01S 2201/02* (2019.08)

(58) Field of Classification Search
CPC ... G01S 5/30; G01S 5/26; G01S 11/14; G01S 2201/02; G01S 5/0027
See application file for complete search history.

(56) References Cited

U.S. PATENT DOCUMENTS 9,689,958 B1 *   6/2017   Wild ....................... G01S 1/751

FOREIGN PATENT DOCUMENTS

JP       2011174759 A     9/2011
JP       2011214920 A    10/2011
(Continued)

OTHER PUBLICATIONS

"Rene Mayrhofer, An Authentication Protocol using Ultrasonic Ranging, Oct. 2006" (Year: 2006).*
(Continued)

*Primary Examiner* — Isam A Alsomiri
*Assistant Examiner* — Abdallah Abulaban
(74) *Attorney, Agent, or Firm* — Sterne, Kessler, Goldstein & Fox P.L.L.C.

(57) ABSTRACT

A positioning system comprising a processing system (7; 9) configured to receive a first position estimate for a mobile device (7), and to receive data representative of an acoustic signal received by the mobile device (7) from one of a plurality of acoustic transmitter units (2, 3, 4, 5). For each of the acoustic transmitter units (2, 3, 4, 5), the processing system (7; 9) determines spatial likelihood data representative of a likelihood of the received acoustic signal having been transmitted by the respective acoustic transmitter unit by comparing a time-of-flight range value with a geometric distance value, representative of a distance between the acoustic transmitter unit and the first position estimate. The processing system (7; 9) processes the spatial likelihood data to identify a subset of the acoustic transmitter units, and processes information relating to the positions of the acous- (Continued)

tic transmitter units in the identified subset and/or relating to the acoustic signals transmitted by the acoustic transmitter units in the identified subset, to determine a second position estimate for the mobile device (7).

19 Claims, 3 Drawing Sheets

(51) Int. Cl.
     *G01S 11/14*    (2006.01)
     *G01S 5/00*     (2006.01)

(56) References Cited

FOREIGN PATENT DOCUMENTS

| WO | WO 2019/038542 A2 | 2/2019 |
| WO | WO 2019/145923 A2 | 8/2019 |

OTHER PUBLICATIONS

International Search Report mailed Apr. 13, 2021 for International Appl. No. PCT/EP2021/051213, 3 pages.
Written Opinion mailed Mar. 30, 2021 for International Appl. No. PCT/EP2021/051213, 6 pages.

* cited by examiner

LIKELIHOOD-BASED ACOUSTIC POSITIONING

BACKGROUND OF THE INVENTION

This invention relates to systems and methods for determining the position of a mobile device.

It is known to use signals, such as ultrasonic signals, to determine the position of mobile units or tags, in two or three dimensions, by transmitting acoustic signals from a plurality of acoustic transmitter units, which may be fixed to the walls or ceilings of a building. The signals encode identifiers of the respective transmitters units. These signals are received by the mobile devices, which may be attached to objects such as people or equipment. If the positions of the acoustic transmitter units are known, then the times at which a mobile device receives signals transmitted by the respective transmitter units (i.e. the times of arrival) can be used to estimate the position of the mobile device within the environment, using geometric principles relating to the propagation of the signals—e.g. by solving an equation relating to the intersection of circles, spheres or hyperboloids.

For example, WO 2019/038542 discloses an acoustic positioning system in which a plurality of static transmitter units transmit phase-modulated ultrasonic signatures at regular intervals. The signatures can be received by a mobile device and their times of arrival used to estimate the position of the device using a geometric multilateration process. The position of the mobile device can be displayed on a map or plan of the environment.

Positioning using acoustic signals can be beneficial compared with using speed-of-light signals, such as radio or infrared, because the speed-of-sound flight times are much longer and so the timing precision required to measure a time-of-flight (ToF) range with a desired spatial resolution is much lower. However, acoustic signals present challenges in terms of having limited bandwidth and low signal-to-noise ratio (SNR), especially in an indoor environment which will typically contain many surfaces that are highly reflective to sound waves. These challenges mean that it is not always possible to decode an identifier accurately from a received acoustic positioning signal, resulting in uncertainty as to the source of the acoustic signal—i.e. in the identity of the acoustic transmitter unit that transmitted the received acoustic signal. When there is uncertainty in the identity of the transmitter unit, there will be a corresponding uncertainty in the final position estimate for the mobile device, since geometric positioning algorithms are based on knowing the respective source location for each acoustic signal received by the mobile device.

The present invention provides a novel approach that seeks to provide accurate positioning of a mobile device using acoustic signals.

SUMMARY OF THE INVENTION

From a first aspect, the invention provides a method of determining a position estimate for a mobile device, the method comprising:

receiving a first position estimate for a mobile device;
receiving an acoustic signal at the mobile device, wherein the acoustic signal is transmitted by one of a plurality of acoustic transmitter units that are each transmitting respective acoustic signals at intervals;
for each of the plurality of acoustic transmitter units, determining spatial likelihood data representative of a likelihood of the received acoustic signal having been transmitted by the respective acoustic transmitter unit, by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;
using the spatial likelihood data to identify a strict subset of one or more of the plurality of acoustic transmitter units; and
using information relating to the positions of the acoustic transmitter units in the identified subset and/or relating to the acoustic signals transmitted by the acoustic transmitter units in the identified subset when determining a second position estimate for the mobile device.

From a second aspect, the invention provides a positioning system comprising a processing system configured:

to receive a first position estimate for a mobile device;
to receive data representative of an acoustic signal received by the mobile device from one of a plurality of acoustic transmitter units that are configured to transmit respective acoustic signals at intervals;
for each of the plurality of acoustic transmitter units, to determine spatial likelihood data representative of a likelihood of the received acoustic signal having been transmitted by the respective acoustic transmitter unit by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;
to process the spatial likelihood data to identify a strict subset of one or more of the plurality of acoustic transmitter units; and
to process information relating to the positions of the acoustic transmitter units in the identified subset and/or relating to the acoustic signals transmitted by the acoustic transmitter units in the identified subset to determine a second position estimate for the mobile device.

Some embodiments of the positioning system may further comprise the plurality of acoustic transmitter units. Some embodiments of the positioning system may further comprise the mobile device.

From further aspects, the invention provides a computer program, and a transitory or non-transitory computer-readable medium storing a computer program, comprising instructions that, when executed by a processing system, cause the processing system:

to receive a first position estimate for a mobile device;
to receive data representative of an acoustic signal received by the mobile device from one of a plurality of acoustic transmitter units that are configured to transmit respective acoustic signals at intervals;
for each of the plurality of acoustic transmitter units, to determine spatial likelihood data representative of a likelihood of the received acoustic signal having been transmitted by the respective acoustic transmitter unit by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;

to process the spatial likelihood data to identify a strict subset of one or more of the plurality of acoustic transmitter units; and to process information relating to the positions of the acoustic transmitter units in the identified subset and/or relating to the acoustic signals transmitted by the acoustic transmitter units in the identified subset to determine a second position estimate for the mobile device.

The mobile device may comprise the processing system, or the processing system may be at least partly distinct from the mobile device, e.g. comprising a remote server.

Thus it will be seen that, in accordance with embodiments of the invention, an updated position estimate for the mobile device is determined, starting from an initial position estimate, by using the initial position estimate to identify a subset (i.e. a shortlist) of candidate transmitter units, and by considering information relating to each of these candidate transmitter units when calculating the position estimate. The subset of transmitter units may be identified by assessing for spatial consistency, across all of the transmitter units, the hypotheses that the received acoustic signal came from a respective one of the transmitter units. In effect, this can be seen as applying a "spatial filter" to the data relating to the plurality of transmitter units. By eliminating one or more of the transmitter units from further consideration, the level of uncertainty can be reduced when determining the new position estimate, which may therefore result in a position estimate that is more accurate.

Preferably each acoustic transmitter unit in the identified subset has a higher likelihood of having transmitted the acoustic signal received by the mobile device than at least one acoustic transmitter unit, of the plurality of acoustic transmitter units, that is not in the identified subset. This higher likelihood may be determined solely in accordance with the spatial likelihood data, or in accordance with a combination of the spatial likelihood data and other likelihood data, e.g. temporal likelihood data, as described in more detail below.

The processing system is preferably configured to determine the second position estimate for the mobile device without further processing information relating to the position of any of the acoustic transmitter units that is not in the identified subset and without further processing information relating to the acoustic signals transmitted by any of the acoustic transmitter units that is not in the identified subset, after the subset has been identified. In this way, the positioning process can be particularly efficient.

The first position estimate may be an earlier position estimate determined using one or more acoustic signals received by the mobile device, or it may be a position estimate determined at least in part using one or more electromagnetic or magnetic signals received or transmitted by the mobile device (e.g. one or more Bluetooth Low Energy™, WiFi™ or GPS signals), or may be a position estimate determined at least in part using one or more further acoustic signals received or transmitted by the mobile device (e.g. from a separate acoustic positioning system and/or in a different frequency band from a frequency band containing the aforesaid acoustic signals). When the first position estimate is determined using signals other than the acoustic signals, the first position estimate may be relatively inaccurate (e.g. having a larger error margin) compared with the second position estimate.

The comparing of each time-of-flight range value with the geometric distance value may be done in any appropriate way. It may be a direct comparison, e.g. comprising a subtraction operation. However, in some embodiments, the spatial likelihood data is generated by comparing each time-of-flight range value with a respective statistical distribution, representative of likelihood against range, which may have an expected value equal to the geometric distance value for the respective acoustic transmitter unit. Each time-of-flight range may be compared against a common form of statistical distribution (albeit potentially having different means and/or variances)—i.e. a distribution defined by a common equation, which may be parameterised by a mean value and/or a variance value. Each statistical distribution may be skewed or may be symmetrical. Each statistical distribution may be a bell curve. It may be defined at least in part by a Gaussian function. It may be a normal distribution, or may be proportional to a normal distribution. The statistical distribution may have a standard deviation of between 0 and 10 metres. The processing system may be configured to control the variance parameter of the statistical distribution; it may set the variance parameter in dependence on any one or more of: the time-of-flight range value; data representative of an uncertainty in the first position estimate; and data representative of a difference between the first position estimate when the first position estimate has been determined without using acoustic signals (e.g. determined using radio signals) and an earlier position estimate determined using one or more acoustic signals received by the mobile device. In some embodiments, the variance parameter may be a value greater than 4 metres and may be less than 50 metres; such values have been found to give good performance in a typical indoor environment, particularly when the acoustic signals and ultrasonic signals and when the first position estimate is determined using BLE™ beacons. The statistical distribution may have an integral, over all distances, of one, although this is not essential. It may be a probability density function, or may be proportional to a probability density function.

Thus, when performing position estimation in the horizontal plane, some embodiments may effectively centre an annular Gaussian spatial filter around each candidate transmitter unit, and assign a higher spatial likelihood to those transmitter units for which the time-of-flight range, measured from the candidate transmitter unit, is consistent with a position closer to a mean ring of the spatial filter. If the position estimation is performed in three dimensions, then the corresponding Gaussian spatial filter may be regarded as spherical.

The plurality of acoustic transmitter units may all be in the same room or in the same building or on the same floor or zone of a building. A selection process may be used to identify the plurality of acoustic transmitter units from a larger set of acoustic transmitter units, before determining the spatial likelihood data. If the mobile device has already been determined to be in a particular floor, section or room of a building, the spatial likelihood data may be determined only for the transmitter units in that floor, section or room.

In some embodiments, temporal likelihood data is determined for each of a second plurality of acoustic transmitter units that are configured to transmit acoustic signals at intervals. The second plurality may be the same as, or overlap with, or be distinct from the first plurality of acoustic transmitter units. The temporal likelihood data may be representative of a likelihood of the received acoustic signal having been transmitted by a respective acoustic transmitter unit based on a time of arrival of the received acoustic signal at the mobile device and on scheduling data representative of a time of transmission of an acoustic signal by the respective acoustic transmitter unit. This can provide a temporal filter, based on the insight that acoustic signals typically decay rapidly over time and so will only be detectable for a short time after they are transmitted. Unlike the spatial likelihood filter, this temporal likelihood filter does not require an initial position estimate. The temporal likelihood data may be generated, for each acoustic transmitter unit, by comparing the time of arrival against a respective statistical distribution, which may have a uniform value over a time window of predetermined duration, starting from the time of transmission of an acoustic signal by the respective acoustic transmitter unit. The same predetermined duration may be used for all of the second plurality of acoustic transmitter units. The statistical distribution may further decrease towards zero after the end of the time window—e.g. with a linear or Gaussian decline. The statistical distribution may be zero for all times prior to the scheduled time of transmission of the respective transmitter unit; however, to allow for the possibility of imperfect time synchronisation across the system, the statistical distribution may instead decrease towards zero backwards in time before the scheduled time of transmission for the respective transmitter unit—e.g. with a linear or Gaussian decline. The statistical distribution may have an integral, over all time, of one; thus it may be used as a probability density function.

In some embodiments, the second plurality of acoustic transmitter units may include the first plurality of acoustic transmitter units, for which spatial likelihood data are calculated. The second plurality may be a larger set. In some embodiments, the temporal likelihood data may be determined first, and may be used to select the first plurality of transmitter units as a subset of the second plurality (e.g. a strict subset). This may provide an efficient filtering process in embodiments in which the temporal likelihood data requires less processing resource to determine than the spatial likelihood data. The processing system may process the temporal likelihood data to identify the first plurality as a subset of the second plurality of acoustic transmitter units wherein each acoustic transmitter unit in the identified first plurality has a higher likelihood (according to the temporal likelihood data) of having transmitted the acoustic signal received by the mobile device than at least one acoustic transmitter unit that is not in the identified first plurality.

In some embodiments, the temporal likelihood data may be determined after the spatial likelihood data is determined. It may be determined for each of the strict subset of the first plurality of acoustic transmitter units that is identified using the spatial likelihood data. The processing system may process the temporal likelihood data to identify a further subset of acoustic transmitter units (which may be a strict subset), wherein each acoustic transmitter unit in the identified further subset has a higher likelihood (according to the temporal likelihood data) of having transmitted the acoustic signal received by the mobile device than at least one acoustic transmitter unit that is not in the identified further subset. The second position estimate may be determined by processing information relating to the acoustic signals transmitted by and/or to the positions of the acoustic transmitter units in this further subset.

In another set of embodiments, the temporal likelihood data and the spatial likelihood data may be used together to identify the strict subset of one or more of the plurality of acoustic transmitter units. In some embodiments, a multiplication operation may be applied to the temporal likelihood data and the spatial likelihood data to determined combined likelihood data, which may be used to identify the strict subset of one or more of the plurality of acoustic transmitter units.

In any of these embodiments, a subset of the transmitter units may be determined by applying a threshold to the relevant likelihood data (e.g. to the spatial likelihood data or to the combined likelihood data). Transmitter units having a likelihood higher than the threshold may be selected for inclusion in the subset, while any below the threshold may be excluded. Alternatively, a subset may be identified by comparing the relevant likelihood data across the transmitter units—e.g. to select a predetermined number or proportion of the transmitter units for inclusion in the subset, from a highest likelihood downward.

Each acoustic transmitter unit may transmit acoustic signals are intervals, which may be regular—e.g. once every one second. Transmitter units that in audible range may be configured to transmit in different time slots; this can improve the signal-to-noise ratio (SNR) by reducing the chance of the mobile device simultaneously receiving multiple signals, from different transmitter units.

In some embodiments, the acoustic signals transmitted by each acoustic transmitter unit encode identification data for the respective acoustic transmitter unit. The identification data does not necessarily uniquely identify the transmitter unit across a whole deployment. This is because the bandwidth of acoustic signals is very low, and so identifiers must be relatively short if the update rate of the positioning system is to be acceptably high, especially since it may be desirable for. This is especially true when receiving signals on a smartphone that operates in the near ultrasound frequency range, where as little as 1 kHz bandwidth may be available for use. In some embodiments, there may be around ten to a hundred different codes in use, but there may potentially be thousands of transmitter units. The identification data transmitter by a transmitter unit may be constant across all of the acoustic signals it transmits; this can simplify the decoding process.

The processing of information relating to the acoustic signals transmitted by the identified subset of acoustic transmitter units to determine a second position estimate may comprise using respective identification data associated with each of the identified subset when decoding the received acoustic signal. The decoding may be performed without using respective identification data associated with any of the acoustic transmitter units that is not in the identified subset. The processing system may comprise a hardware or software decoder which may be configured to decode the received signal using cross-correlation. The decoder may determine respective correlation coefficient data by cross-correlating the data representative of the received acoustic signal with identification data associated with each of the identified subset (but without correlating against identification data associated with one or more transmitter units not in the identified subset). In this way, the decoding process may be more efficient than if the received signal were cross-correlated with every possible identification data. The decoding operation is likely to be much more resource intensive than the spatial and temporal filtering steps, and so using the spatial and/or temporal filtering to reduce the amount of decoding effort required can significantly improve the efficiency of the position determination process overall.

The positioning system may comprise a decoder configured to identify exactly one of the acoustic transmitter units as the source of the received acoustic signal. However, in some embodiments, the decoder may generate decoding likelihood data for each of a plurality of the acoustic transmitter units (e.g. for all of the identified subset of transmitter units) representative of a likelihood of the received acoustic signal having been transmitted by the respective acoustic transmitter unit. This likelihood data may be determined from correlation coefficient data output by a correlator.

The second position estimate may be determined by solving a geometric optimisation problem involving the positions of one or more of the acoustic transmitter units—e.g. a minimisation problem for over-specified spherical or hyperbolic intersections. The optimisation problem may be weighted using the spatial likelihood data, temporal likelihood data and/or decoding likelihood data.

In some embodiments, a new position estimate is determined for each new acoustic signal received by the mobile device. Data obtained from previously-received acoustic signals (e.g. time-of-flight range data) may be used when solving the optimisation problem. The processing system may store, for a plurality of acoustic transmitter units, a most-recent time-of-flight range value received from the respective acoustic transmitter unit. The processing system may use these values, along with information relating to the latest-received acoustic signal, when determining the second position estimate. If the decoder identifies a single source transmitter for each received acoustic signal, then the position of the respective source transmitter unit may be used for determining the second position estimate. If the decoder generates decoding likelihood data for a plurality of candidate transmitter units, the decoding likelihood data may be used when determining the second position estimate.

The scheduling data may be pre-programmed in the mobile device, or may be received by the mobile device from a remote device—e.g. over a radio communication channel. The scheduling data for an acoustic transmitter unit may represent a time of transmission of a most recent acoustic signal transmitted by the respective acoustic transmitter unit. The acoustic signals transmitted by each transmitter unit may be spaced apart in time and/or may be of an amplitude such that the mobile device cannot detect an earlier signal after a later signal has been transmitted by the same transmitter unit; e.g. the signals may be transmitted once every one second, but may decay to inaudible levels after around 80 ms. Thus, in such embodiments, only the latest signal from any particular transmitter unit need be considered when determining the time-of-flight range value, e.g. by subtracting the time of arrival from the time of most recent transmission.

The acoustic transmitter units and the mobile device may each comprise a respective clock. The clocks may be synchronised so that an accurate time-of-flight range value may be determined by subtracting the scheduled time of transmission of an acoustic signal, according to a clock of the relevant acoustic transmitter unit, from the time of arrival of the acoustic signal, measured by a clock on the mobile device.

The geometric distance value may be determined as a straight-line distance between a position of an acoustic transmitter unit (which be stored as position data accessible to the processing system) and the first position estimate. It may be determined in one dimension (e.g. along only an X axis), two dimensions (e.g. considering horizontal X-Y plane coordinates only) or in three dimensions.

In some embodiments, the first position estimate is determined at least in part using one or more electromagnetic signals (e.g. radio or infrared signals) or one or more further acoustic signals (e.g. in a different frequency range from the first acoustic signals used to determine the spatial likelihood data)—e.g. using data relating to the amplitude and/or arrival time of an electromagnetic signal received or transmitted by the mobile device. The electromagnetic signal(s) may be transmitted by, or received by, one or more electromagnetic transmitter or receiver units—e.g. Bluetooth™ nodes or beacons. In some embodiments, one or more—and optionally all—of the acoustic transmitter units are also electromagnetic transmitter or receiver units. This may make installation more convenient.

The processing system may be configured to determine, for each electromagnetic transmitter or receiver unit, a range estimate based on respective received signal strength (RSS) information for one or more electromagnetic signals sent between the transmitter or receiver unit and the mobile device. When using a plurality of such signals, which may be received at intervals over a time window, the processing system may determine a weighted average of the received signal strength information, with a newer and/or a stronger RSS value weighted higher than an older and/or weaker RSS value.

The first position estimate may be received from outside the processing system—e.g. over a network connection from a separate processing system—or it may be generated by the processing system (i.e. such that it is received internally within the processing system). The processing system may calculate the first position estimate using position data relating to the positions of one or more electromagnetic transmitter or receiver units—e.g. coordinates in one, two or three dimensions. It may determine the first position estimate as the centroid of a set of electromagnetic transmitter or receiver units with which the mobile device has exchanged an electromagnetic signal, wherein each of the electromagnetic transmitter or receiver units may be assigned a weight corresponding to received signal strength information for that transmitter or receiver unit—e.g. a weight equal to the weighted average of the received signal strength information for the transmitter or receiver unit.

The processing system may be configured to determine a series of two or more position estimates over time, by processing acoustic signals received by the mobile device. The position estimates may be determined at regular intervals, e.g. every one second. Each position estimate may be determined from a respective set of acoustic signals; these sets may be non-overlapping, e.g. by being calculated using information relating only to a most recent acoustic signal received from each transmitter unit. Spatial likelihood data may be determined for each successive position estimate. Each successive position estimate may be determined using a geometric distance value, representative of a distance between a respective acoustic transmitter unit and the immediately preceding position estimate in the series of the position estimates. However, the processing system may be configured to compare, at intervals, the position estimates determined using acoustic signals against one or more position estimates determined using electromagnetic signals (e.g. later BLE-derived signals). It may detect if an inconsistency arises—e.g. if the acoustic-based position estimate lies outside an error ellipse defined around the latest electromagnetic-based position estimate.

The processing system may thus also determine a series of position estimates over time using information relating to electromagnetic or magnetic signals transmitted or received by the mobile device—e.g. from BLE™ beacon signals received by the mobile device. The aforesaid "first position estimate" may be a most recent position estimate in such a series. These electromagnetic-based position estimates may be determined at intervals—e.g. once, twice or three times every five seconds. They may be determined in parallel—i.e. over a common time period—with determining the acoustic-based position estimates. They may be used to verify the acoustic-based position estimates by the calculation of spatial likelihood data as disclosed herein.

The acoustic transmitter units and/or the mobile device may be battery-powered. This can simplify installation.

Each position estimate may be determined in one dimension, two dimensions or three dimensions. The second position estimate may be stored or output or processed further. It may be input to a Kalman filter.

References to distances and ranges herein may refer to line-of-sight distances, or they may refer to total path lengths e.g. in situations where there is reflection or diffraction.

The processing system may comprise processing circuitry and/or one or more processors and memory storing software for execution by the one or more processors. The processing circuitry and/or software may implement any of the features disclosed herein.

The mobile unit may comprise some or all of the processing system. This may be particularly appropriate when the mobile unit has a display screen and powerful processor, for example if it is a smartphone. In such embodiments, the mobile unit may be arranged to calculate and store its own position estimate or estimates. This may avoid the need to communicate data from the mobile unit to be processed elsewhere—e.g., on a remote server.

However, in one set of embodiments, one or more of the transmitter units may comprise some or all of the processing system, while in another set of embodiments, some or all of the processing system may be external to both the mobile unit and the transmitter units—e.g. comprising one or more external servers. This may be advantageous in reducing the processing requirement on the mobile unit, which can reduce its cost and power consumption, even after accounting for the need to transmit data from the mobile unit (e.g., by radio). This may be helpful when the mobile unit is battery powered, e.g. being an asset tag. The processing system may be split across multiple processors or multiple locations, or both. The mobile unit may be configured to transmit data representative of the received locating signals, or information derived therefrom, to a remote processing unit. The mobile unit and/or a transmitter unit may comprise a wired or wireless transmitter, such as a radio transmitter, for transmitting information relating to a received or transmitted signal.

In some embodiments, the mobile unit may comprise only some parts, or even none, of the processing system while other parts of the processing system—e.g., elements configured to use a time of arrival and decoded transmitter-unit identifier to determine the range data representative of a distance to the mobile unit—may reside in one or more other units, such as on a remote computer or server. The mobile unit may comprise a radio, optical, or other transmitter—e.g., a Bluetooth™, WiFi™ or cellular network transmitter. It may use the transmitter to transmit data relating to the received signals, such as an audio file, or digital samples, or processed data, to a remote processing unit.

In some embodiments, the mobile unit comprises a processor and a display. It may be a mobile telephone (cellphone) or smartphone or tablet or other portable computing device. Alternatively, it may be an asset tag without any complex graphical user interface.

Each acoustic transmitter unit may comprise a radio antenna, light-emitting element (which may emit infrared or visible light), acoustic transducer, or other appropriate means of transmitting the locating signals. It may comprise appropriate circuitry for driving or controlling the transmission, such as a DAC, an amplifier, etc. In a preferred set of embodiments, each acoustic transmitter unit comprises at least one ultrasound transducer for generating ultrasonic signals. The transmitter units may emit the locating signals at regular intervals, e.g. once every second. The transmitter units may be mobile, but in some embodiments they are static—e.g. fastened to walls or ceilings. They may be beacons.

The mobile unit may comprise a radio antenna, light-receiving element (for receiving infrared or visible light), acoustic microphone, or other appropriate means of receiving the locating signals. It may comprise appropriate circuitry for controlling the reception, such as an amplifier, an ADC, etc. It may sample received acoustic signals. In a preferred set of embodiments, the mobile receiver comprises at least one ultrasound transducer for receiving ultrasonic signals.

The processing system and/or each acoustic transmitter unit and/or each electromagnetic transmitter or receiver unit and/or the mobile unit may comprise any one or more of processors, DSPs, ASICs, FPGAs for carrying out the described steps. It may comprise memory for storing data and/or for storing software instructions to be executed by a processor, DSP or FPGA. It may comprise any other appropriate analogue or digital components, including power supplies, oscillators, ADCs, DACs, RAM, flash memory, network interfaces, user interfaces, etc. It may be a single unit or may comprise a plurality of processing units, which may be arranged to communicate by one or more wired or wireless links.

The processing system may further comprise data storage and/or a display and/or a data connection, and may be configured to store and/or display and/or communicate electronically information relating to the estimated position of the mobile unit. The system may, for example, be arranged to indicate the position of the mobile unit on a map or plan of a building or the environment.

The system may comprise a radio transmitter arranged to transmit timing information to the acoustic transmitter units and/or the mobile unit. The transmitter units and mobile unit may be synchronised so that time of arrival information can be used for positioning, instead of time difference of arrival. This may require fewer transmitter units to be in range of the mobile unit for accurate positioning.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
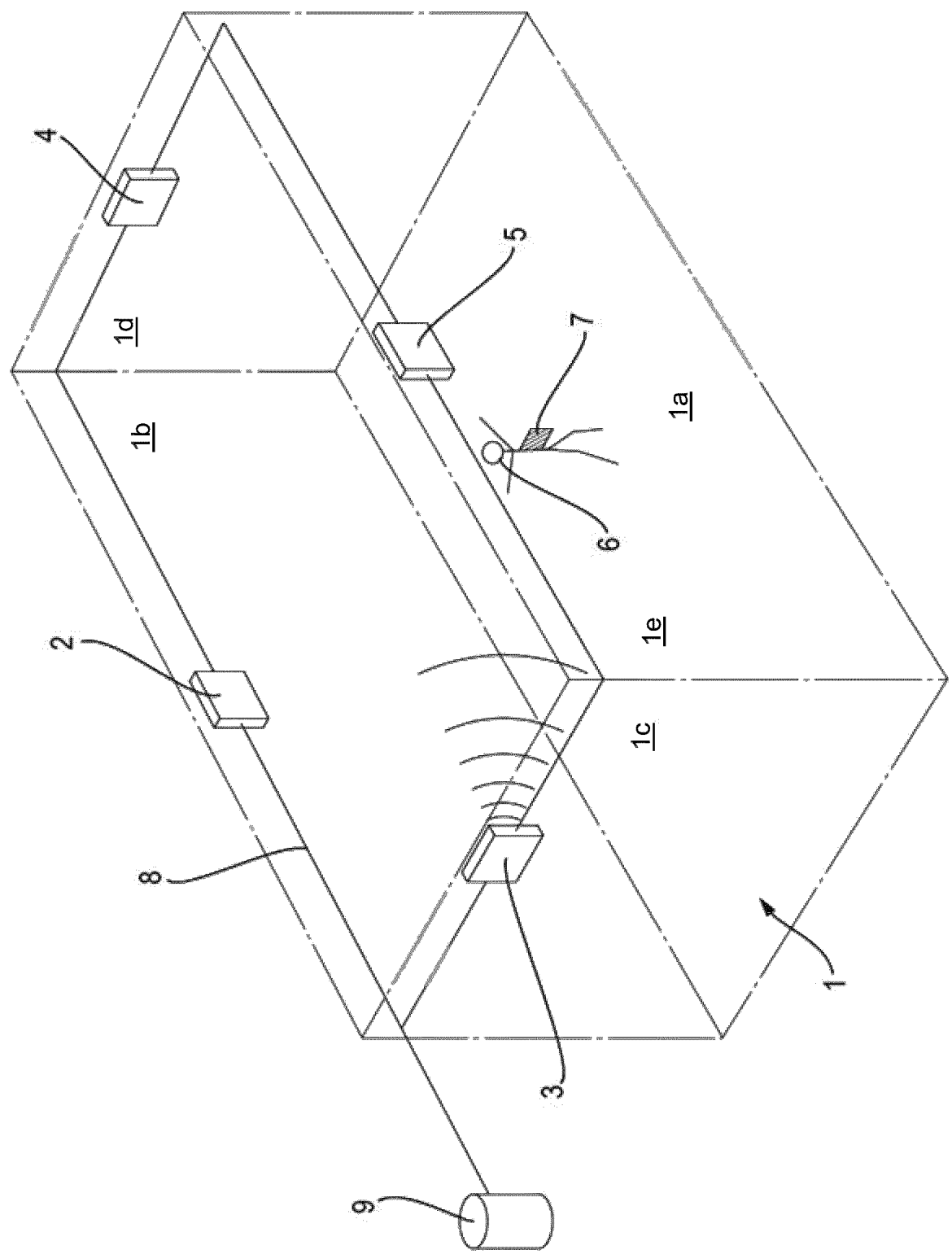
FIG. 1 is a perspective diagram of a positioning system embodying the invention.

FIG. 1 shows elements of a positioning system that may be used in, for example, a shopping mall in order to determine the locations of shoppers within the shopping mall. Of course, this is just one example environment, and the positioning system could also be used in warehouses, hospitals, domestic homes, vehicles, etc.

FIG. 1 shows a room 1 defined by a horizontal floor 1a, a rear wall 1b, a left end wall 1c, a right end wall 1d and a front wall 1e. Other details, such as doors, furniture, etc. are omitted for simplicity. Four static transmitter units 2, 3, 4, 5 are fastened to the walls 1b, 1c, 1d, 1e of the room.

A person 6 in the room is carrying a mobile device 7, such as a smart phone. A network cable 8 connects each transmitter unit 2-5 to a server 9, which is typically located in another room or in another building or off site. Alternatively the transmitter units 2-5 could be connected wirelessly, e.g. over a WiFi network. These components cooperate to provide a positioning system, capable of estimating the position of the mobile device 7 in up to three dimensions—e.g. as an (x, y, z) coordinate—within the room 1. In practice, the system may have further similar transmitter units installed throughout a building or series of rooms, and a plurality of mobile devices attached to, carried by, or incorporated into people, animals, vehicles, robots, stock, equipment, etc.

Figure 2:
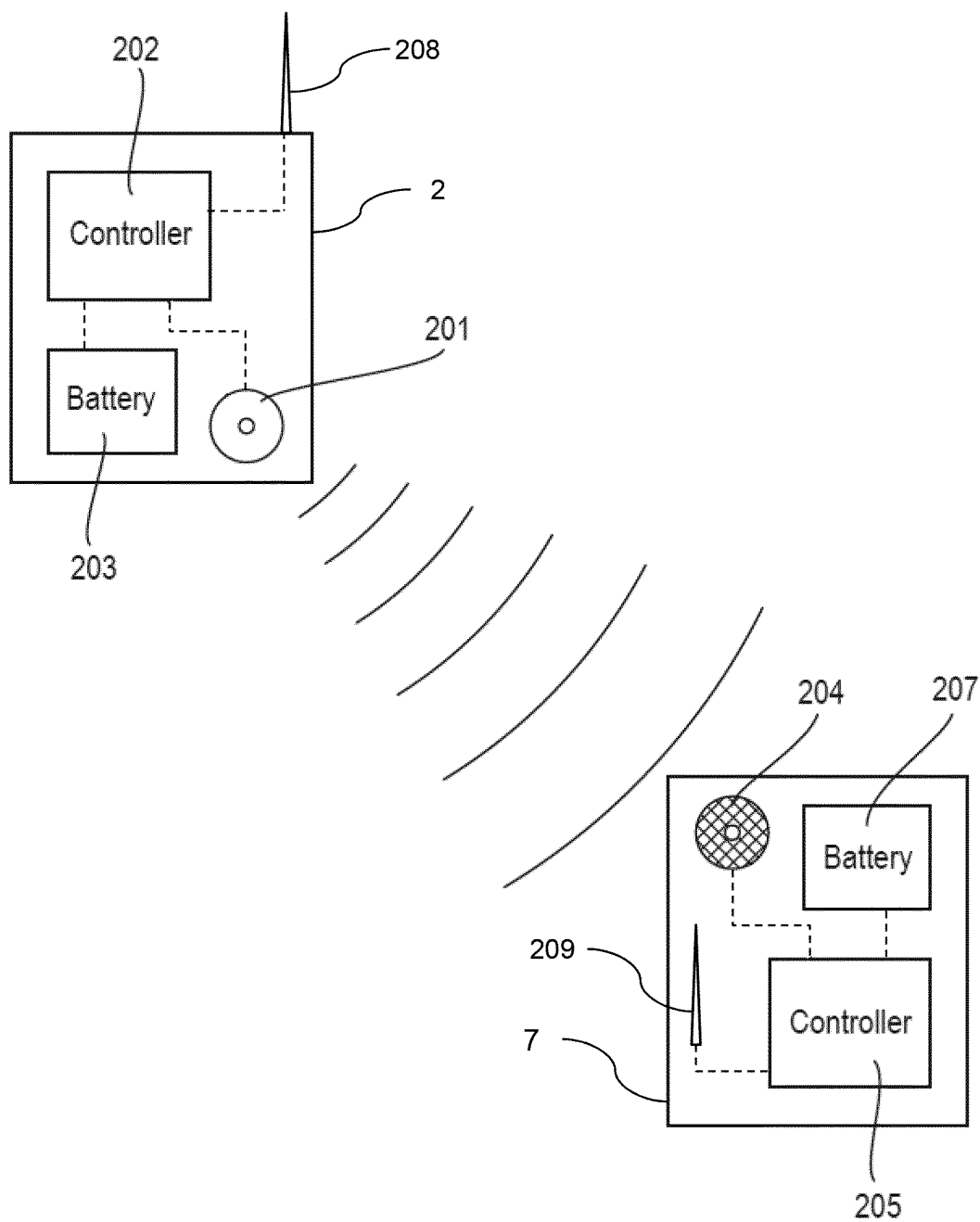
FIG. 2 is a schematic drawing of a static transmitter unit and a mobile device for use in the positioning system.

FIG. 2 shows a representative one 2 of the transmitter units, and a mobile device 7. The transmitter unit 2 has an ultrasonic sounder 201, a controller 202 for causing the ultrasound transducer 201 to transmit ultrasonic signals, and battery 203 for supplying power to the transmitter unit. It also contains a radio antenna 208 and circuitry in the controller 202 for transmitting (and optionally receiving) Bluetooth Low Energy™ (BLE) radio signals. The other transmitter units 3, 4, 5 are similarly configured. The mobile device 7 has a microphone 204 capable of receiving ultrasonic signals from the transmitter units 2-5, a controller 205 for sampling and processing the received ultrasonic signals, a radio antenna 209 for transmitting and receiving BLE signals, and a battery 207 for powering the mobile device 7. The transmitter units 2-5 and mobile device 7 may have further standard electronic components such as further radio transceivers, wired-network interfaces, display screens, batteries, buttons, etc. In some embodiments, the mobile device 7 is a tablet or mobile telephone (cellphone) such as an Apple™ or Android™ smart phone.

Although this description relates to measuring the time of flight of ultrasound signals, it should be appreciate that the use of ultrasound is not essential and other embodiments may instead transmit locating signals that are audible acoustic signals or that are electromagnetic signals such as infrared signals or radio signals.

The controllers 202, 205 may include one or more processors, DSPs, ASICs and/or FPGAs. They may include memory for storing data and/or for storing software instructions to be executed by a processor or DSP. They may include any other appropriate analogue or digital components, including amplifiers, oscillators, filters, ADCs, DACs, RAM, flash memory, etc.

Although the transmitter units 2-5 are here shown as being static relative to the environment 1, it will be appreciated that, in other embodiments, they may be mobile—e.g., one or more of the transmitter units could be a respective mobile telephone or device in the possession of a respective user.

In use, each transmitter unit 2-5 transmits, at intervals (e.g. every one second), an ultrasonic locating signal comprising a signature associated with that transmitter unit. The transmissions may be coordinated, e.g. by the server 9, to help reduce interference between nearby transmitter units. The transmission schedule for each transmitter unit 2-5 is published by the server 9, so that a processing system, such as the mobile device 7, can determine the times of transmissions of the ultrasonic signals by each transmitter unit 2-5. If each transmitter unit 2-5 transmits at regular intervals, then the schedule may comprise an offset value for each transmitter unit 2-5. This may be encoded as a time slot identifier. In some embodiments, each transmitter unit 2-5 may transmit a 12 ms long ultrasonic signal every 1,000 ms, in an allocated one of 16 non-overlapping time slots, each of approximately 60 ms duration. In a room 1 containing only four transmitter units 2-5, each unit can be allocated a unique time slot, but in larger rooms, or across a wider area, it will be necessary to allocate the same time slot to multiple transmitter units. Ideally, time slots are shared only between transmitter units that are far apart, so the mobile unit 7 is unlikely to be in audible range of both at the same time.

In general, the ultrasonic signal from a transmitter unit 2-5 will decay so as to be practically undetectable by the mobile unit 7 after about 80 ms from transmission (corresponding to a distance of 27 metres). Therefore, the time of arrival of a signal, relative to an expected transmission time slot, may be used to help identify the source transmitter unit for the signal, as described in more detail below.

Each signature is encoded on an ultrasonic carrier—e.g., a 20 kHz or 40 kHz carrier. The signature may be encoded using any appropriate frequency-shift or phase-shift encoding, but in one set of embodiments, the signature of each transmitter unit 2-5 comprises a respective binary identifier encoded using frequency-shift-keying (FSK) modulation. The signature may be contained in a longer transmission that comprises one or more additional elements, such as a fixed preamble and/or a variable data portion, which may be encoded in the same ultrasonic carrier band as the signature.

The low bandwidth of ultrasonic communication constrains the maximum bit-length that can be used in the signatures while still providing an acceptable update rate (e.g. once a second). Therefore, in a large deployment, the ultrasonic signatures may also be unique only within a locality, with the same signature being allocated to multiple transmitter units across the system. As with the time slots, ideally signatures are shared only between transmitter units that are far apart, so the mobile unit 7 is unlikely to be in audible range of both at the same time.

The mobile device 7 receives and demodulates the ultrasound signals to identify signatures that have been transmitted by transmitter units 2-5 within audible range of the device 7. However, due to noise and interference, this decoding will not always be reliable.

The mobile device 7 uses an internal clock to timestamp received signatures, representing a time of arrival for each signal. The mobile device 7 may be synchronised with each of the transmitter units 2-5 (and optionally with the server 9) and can therefore calculate at least one time of flight (ToF) value for each signature it receives by accessing scheduling data representative of a time of transmission of an acoustic signal by a respective acoustic transmitter unit and subtracting the time of arrival from the time of transmission. The scheduling data may be provided to the mobile device 7 by the server 9, e.g. over a radio communication link. By combining three or more TOF measurements from known transmitter locations, the position of the mobile device 7 can be determined using geometric principles of trilateration (also referred to as multilateration). The clock synchronisation may be carried out using a radio channel, such as a Bluetooth Low Energy™ connection, or in any other suitable way.

In other embodiments, the mobile device 7 is not synchronised with the transmitters 2-5, and instead a time difference of flight (TDoF) method may be used to determine the position of the device 7. In this case, more transmitter units may have to be in range of the mobile device 7 for an accurate position estimate to be determined.

The position of the device 7 may be estimated in three dimensions (e.g., as an <x, y, z> Cartesian coordinates relative to a reference frame of the room 1 or building), or in two dimensions (e.g., <x, y> in a horizontal plane only), or in one dimension (e.g. as a distance, x, along a corridor). The position determination calculations may be performed on the mobile device 7, or the device 7 may send information about the received signals, such as timing and/or range data, to the server 9, which may perform part or all of the calculations described herein.

The mobile device 7 will typically receive the same acoustic signal from a transmitter unit 2-5 along a direct path (assuming there is a clear line of sight) and also along one or more indirect paths, after reflection off one or more surfaces in the environment. These multiple instances of the same transmitted signal may arrive overlapped in time. This can present a challenge when decoding the signature accurately. The strength of the instances received along the indirect (reflected) signals will typically be lower than the strength of the direct-path signal, although this is not necessarily always the case (e.g., if a microphone on the device 7 is angled towards a highly reflective surface such as a glass window pane). The device 7 may use signal strength to help identify direct-path signals, for use in a position-determining algorithm.

The times of flight of received direct-path signals can be input to a multilateration positioning algorithm. In some embodiments, the times of flight of any reflections (echoes) are disregarded in the geometric fit process, although the reflected signals may in some embodiments be used to assist in decoding a received direct-path signature. However, in other embodiments, the times of arrival of reflections may also be used when determining geometric information about the position of the device 7. Such embodiments may make use of known locations of major reflective surfaces in the environment. Techniques involving real and virtual transmitter locations, which may be employed in such embodiments, are disclosed in WO 2018/162885, filed 5 Mar. 2018, the contents of which are hereby incorporated by reference. The location of the mobile device 7 may, in some embodiments, be estimated at least in part by estimating an impulse response function from multiple instances of one locating signal, received along a plurality of paths, each instance arriving at a different respective time.

Doppler shift occurs whenever the mobile device 7 is moving towards or away from one or more of the transmitters units 2-5. The positioning system may therefore include a Doppler-shift compensation mechanism to enable accurate decoding of the transmitted signatures.

Although processing steps are, for simplicity, described herein as being carried out by the mobile device 7, it should be understood that, in some embodiments, some or all of these steps may instead be carried out by the server 9, where appropriate. Data, including intermediate results, may be communicated between the device 7 and the server 9 by any appropriate means, such as via a Bluetooth™, WiFi™, IEEE 802.15.4, or cellular radio link, using a suitable local gateway or remote base station. The server 9 may be a single physical device, or may be a distributed (e.g. cloud) server system. It may be in the same building, on or the same site, as the room 1 or remote from it—e.g. in a remote data centre accessed over the Internet.

Because the decoding of a received signature to identify the source transmitter unit 2-5 is not always reliable, there may be significant ambiguity as to the identity of the source of a signal received by the mobile device 7. Further ambiguity is introduced when the same time slot and/or acoustic signature has to be allocated to more than one transmitter unit across the system.

However, the mobile device 7 performs operations to mitigate this ambiguity before it inputs the timing or range information determined from a received signal to a positioning algorithm. This filtering may identify a single most probable source transmitter unit 2-5 for each received signal. Alternatively, the filtering may identify a strict subset of all the transmitter units in system and may pass data relating to this subset of the transmitter units to the positioning algorithm, to be used when calculating a positioning estimate for the mobile device 7.

The filtering may take account of various factors, including:
consistency between the time of arrival of the signal and the latest transmission times of respective transmitter units, based on a signal decay model (referred to herein as "temporal filtering");
consistency between the time-of-flight ranges to respective transmitter units, and the geometric distances to the respective transmitter units calculated using an earlier position estimate (referred to herein as "spatial filtering");
confidence in the decoded signature equalling the signatures of respective transmitter units (referred to herein as "decoding filtering").

This earlier position estimate may be an earlier estimate determined from a set of ultrasonic signals received from the transmitter units 2-5, or it may be a position estimate determined by a different mechanism. Thus, in some embodiments, each of the transmitter units 2-5 also transmits Bluetooth Low Energy™ (BLE) radio beacon signals at regular intervals. The mobile device 7 can use Bluetooth™ radio signals from the transmitter units 2-5 to determine an initial position estimate for the mobile device 7 using suitable processing, such as by measuring received signal strength indicators (RSSI), optionally also taking account of RF time-of-flight measurements.

In other embodiments, the BLE beacon transmitters could be physically separate from the transmitter units 2-5, or the initial position estimate could be determined using WiFi, NFC, UWB, GPS, cellular or infrared positioning, or any other location technology.

The radio positioning system may be able to determine a location estimate with an accuracy of around 10-15 metres (at least in two horizontal dimensions), and a latency of no more than 10-15 seconds (corresponding to a typical human walking speed of around 1 m/s). When using BLE beacons, these may be deployed at a density of approximately one beacon per 25-150 $m^2$. Given a typical distance between beacons of 5-12 m, this can give a positioning accuracy of approximately 3-15 m and a relatively low latency of under 10 s. An important requirement for the radio positioning algorithm may not necessarily be high accuracy but rather delivering a robust conservative initial estimate of the position of the mobile device 7, which is well inside the area enclosed by the ultrasonic transmitter units 2-5.

In other embodiments, rather than receiving the positioning signals from the infrastructure, the mobile device 7 may transmit positioning signals—e.g. radio signals—to be received by static receiver units (which could be the same units 2-5). An initial position estimate could even be received from a human user, e.g. through a graphical user interface on the mobile device 7 that allows the user to identify his location on a map.

A large-scale spatial location (which building, floor, etc.) may be determined using the same signal or may be arrived at using GPS signals during an outdoor to indoor transition or in any other appropriate way. If the mobile device 7 is already known to be on a particular floor, it may be sufficient to determine subsequent position estimates in only two horizontal dimensions. Also, references herein to all the transmitter units in the system may refer to all those transmitter units that are in a particular zone, such as a particular building or floor, if the mobile device 7 has already been localised to this zone.

A very first position estimate may be determined using, e.g. radio beacons, after which a time series of two or more position estimates may be determined using ultrasonic signals, with the spatial filtering for each subsequent ultrasonic-determined position estimate using the immediately preceding ultrasonic-determined position estimate.

However, the device may continue obtaining updated BLE-based position estimates at intervals (e.g. once, twice or three times every five seconds), even while performing ultrasonic-based tracking in which the spatial filtering being based on the preceding ultrasound-based position estimate (e.g. with one new position estimate being calculated every one second). In this way, the BLE position estimates can be used to check the accuracy of each ultrasound-based position estimate, and a recent BLE position estimate will be available to re-initialise the spatial filtering if the position estimation becomes inaccurate.

The filtering may be performed as a single step, or in multiple stages with each stage potentially reducing the number of transmitter units in a candidate set of source transmitter units for a particular received signal. In particular, the decoding of the signature may be performed after temporal and/or spatial filtering have been carried out, since this can efficiently reduce the time and/or energy required for the decoding process, which may be relatively resource intensive.

Figure 3:
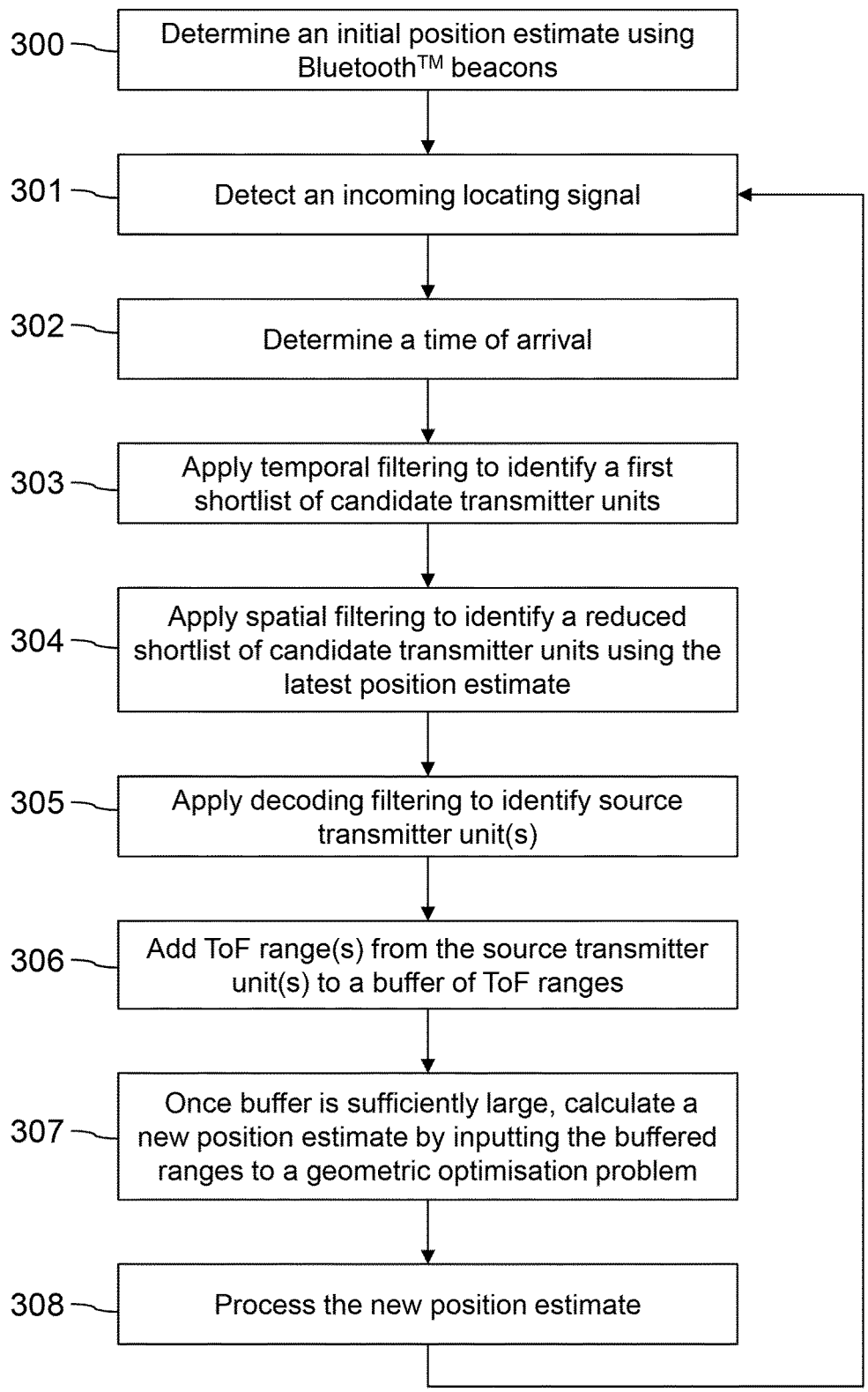
FIG. 3 is a flow chart of operations carried out by the mobile device and/or the server to estimate the position of the mobile device.

FIG. 3 is a flow chart providing an overview of key operations carried out by the mobile device 7 when generating a time series of position estimates. In other embodiments, some or all of these operations may be performed on the server 9.

The mobile device 7 is here assumed already to have been provided with transmission schedules for all the transmitter units in the system, including the transmitter units 2-5 in the room 1, and to have been synchronised with the transmitter units, e.g. by exchanging time-stamped with the server 9 via one or more radio relays (e.g. via BLE transceivers built into the transmitter units 2-5). It also has access to location coordinates for each transmitter unit in the system, in two or three dimensions.

First, BLE beacon signals (e.g. transmitted by the transmitter units 2-5) are used to determine 300 an initial position estimate. This may have an accuracy only in the order of metres, whereas the system aims to track the mobile device 7 with an accuracy in the order of centimetres or better. A new BLE position estimate may be calculated whenever the mobile device 7 is first turned on, or if it ceases to receive any ultrasonic signals for a time, or if confidence in the series of position estimates falls below a minimum threshold.

One approach to generating the initial BLE-based position estimate is to have each BLE beacon (which may be a transmitter unit 2-5, or which may be separate therefrom) transmit three BLE signals per second on the advertising channels with a random timing of its transmit to avoid collisions. The RF beacon signal contains a globally unique identifier for the beacon that the controller 205 in the mobile device 7 can use to identify the beacon from which it is sent. The mobile device 7 scans for these signals with a duty cycle of approximately 50% or 60%, to conserve power, and an on/off periodicity of 10 s or less.

However, at start-up of a positioning session, e.g. of a smartphone 7, a relatively reliable (although not necessarily high-resolution) position estimate r_mobile is required. For this reason, the duty cycling of the BLE receive may be disabled for the first 60 seconds of a session. A reliable initial position estimate r_mobile_BLE is typically determined from received BLE signals after a couple of seconds (i.e. after more than five to ten BLE beacons are received).

To do this, the mobile device 7 processes each received BLE signal in the following way:

on receipt, the mobile device 7 registers a timestamp of receipt and a received signal strength (RSS) of the signal from each beacon within range;

for each unique beacon ID, the controller 205 maintains a buffer with a time window that has a length that is of the order of the on/off periodicity (<10 s);

typically every second the controller 205 calculates a weighted average "range" estimate between the BLE beacon and the mobile device 7 by:

first calculating a RSS_derived_range value that is inspired from a typical channel model for RSS in an indoor environment: RSS_derived_range=(RSS/RSS_0)–p, where RSS_0 is the RSS of the signal transmitted at one metre (this value is normalised for in the method below), the power p depends on the environment and can be found from observations, typically being in the range 1-3 weighting each RSS_derived_range in the buffer is weighted with a weight that decreases linearly from 1 to 0 depending on how close it is to expiring in relation to the time window length, and is also weighted with a weight that scale with $(RSS)^{-2}$ for each measurement in the buffer, to arrive at a weighted average_RSS_derived_range value for each BLE beacon that is dominated by high RSS observations; this ensures that destructive interference effects have little effect on the range estimate.

Note that the average_RSS_derived_range value may not actually be an accurate estimate of the true geometric range between the BLE beacon 2-5 and the mobile device 7; it is nevertheless still useful for crudely estimating the position of the mobile device 7 based on the RSS measurements.

To calculate a BLE-based estimate of the mobile device position, the controller 205 calculates a weighted average beacon position vector, r_mobile_BLE using the beacon position vector $r\_BLE_i$ and the weight (average_$RSS\_derived\_range_i)^{-1}$, where i indexes the BLE beacons, as follows:

$$\text{r\_mobile\_BLE} = \frac{1}{N}\sum_i \text{average\_RSS\_derived\_range}_i^{-1} \cdot \text{r\_BLE}_i$$

where N is the total number of BLE beacons from which the mobile device 7 has received BLE signals during the time window.

A measure of the BLE position spread is also calculated in each dimension (e.g. along orthogonal x, y, z axes when working in three dimensions):

$$r_k\text{\_mobile\_BLE\_spread} = \frac{1}{N}\sum_i \text{average\_RSS\_derived\_range}_i^{-1} \cdot \|(r_k\text{\_}BLE_i - r_k\text{\_mobile\_BLE}\| e_k$$

where k indexes the dimensions (e.g. k=1,2,3, for three dimensions), and $e_k$ is the standard Euclidean basis.

New BLE position estimates and spreads may be determined at regular or irregular intervals, e.g. every 1-5 seconds, even as the acoustic signals are processed.

Incoming audio received at the microphone 204 is sampled and analysed to detect 301 an incoming ultrasonic locating signal from one of the transmitter units. This may involve a down-mixing process, using analogue and/or digital mixing techniques, to generate a stream of complex IQ baseband samples. The received signal may be critically sampled—i.e. at a sample rate close to the Nyquist frequency for the transmitted signatures. The received signature is detected by an appropriate technique; this could involve cross-correlation against template data, or using a deconvolution process, but in some embodiments it uses a sliding energy detector that simply detects burst of energy of 12 ms duration around the carrier frequency (regardless of the encoded content).

A time of arrival of the received signature is determined 302. The timing may be determined relative to the start of the detected energy window signal. In some embodiments, this may be an initial time of arrival estimate, and a more accurate time of arrival may be determined later on in the process, e.g. using a correlator after the signature has been decoded.

A temporal filtering step 303 is then performed to identify a first shortlist of candidate transmitter units for the received signal, based on the time of arrival and the known transmission schedules of all the transmitter units in the system.

In one embodiment, every second is divided into sixteen time slots, and each transmitter unit transmits is allocated one of the sixteen time slots, at the start of which it transmits its 12 ms long location signature, encoding its respective transmitter-unit identifier, repeating every second. The transmission power, receiver sensitivity, and environmental acoustics may be such that each signal will have faded to an undetectable level within two time slots after it is transmitted. The temporal filtering can therefore simply exclude all transmitter units in the system that did not have a transmission scheduled within one of the two times slots preceding the time of arrival. But another way, the controller 205 selects, for inclusion in the first shortlist, all those transmitter units across the system that were scheduled to transmit within the preceding two time slots (i.e. up to 120 ms before the time of arrival, depending on how the time of arrival is located relative to the time slots). Alternatively or additionally, a more complex likelihood value may be calculated and used in this step, e.g. the P_time$_i$ value disclosed below, to which a threshold may be applied to filter out unlikely transmitter units, for example a threshold in the range 5-90%.

A spatial filtering step 304 is then applied to the first shortlist of transmitter units, to obtain a reduced shortlist. This step makes use of the initial position estimate which, although not necessarily very accurate (because it was determined using an inherently less accurate positioning method such as BLE beacons, or because some time has elapsed since it was calculated during which the mobile device 7 may have moved), can nevertheless provide sufficient information to usefully restrict the pool of likely transmitter units that may be the origin of the positioning signal received by the mobile device 7.

The controller 205 considers each transmitter unit, i, on the first shortlist in turn. For each candidate transmitter unit, it subtracts the time of the most recent transmission by that transmitter unit from the time of arrival to determine a time of flight. (Earlier transmissions by the same unit will have long since decayed, assuming transmissions are made on a one-second cycle.) From this, a time-of-flight range value, R_tof$_i$, can be calculated by multiplying by the speed of sound through air. A thermometer may be used to adjust a default speed value based on the ambient temperature. Additionally, the controller 205 calculates the straight-line distance R_geo$_i$ (in one, two or three dimensions, as appropriate) between the known location of the respective transmitter unit and the initial position estimate as R_geo$_i$=|r_mobile−r_tx$_i$|, where r_mobile is the initial position estimate, which may be a latest BLE-derived position estimate r_mobile_BLE, or a latest ultrasound-derived position estimate r_mobile_US, and r_tx$_i$ is the position vector of the respective transmitter unit, i.

The controller 205 uses these values to calculate a spatial likelihood value, P_spatial$_i$, for each of the candidate transmitter units, based on the error normalized by the expected variance:

$$\text{P\_spatial}_i = e^{-\frac{(R\_geo_i - R\_tof_i)^2}{var\_eff}}$$

where var_eff is a value representative of an estimate of the variance of the error between the geometric distance, R_geo, and the ToF derived distance, R_tof.

This var_eff value may be calculated in any appropriate way. It may simply be a fixed constant value (e.g. 4 m$^2$) or it may depend on one or more factors, such as any of:

R_tot;

the spread in the r_mobile position estimate (e.g. $r_k$_mobile_BLE_spread as defined above, when r_mobile is a BLE-based estimate, r_mobile_BLE); and if a previous ultrasound-based position estimate is also available, the error between the previous ultrasound-based position estimate and the latest BLE-based position estimate.

In general, the standard deviation varies between 0 and 10 metres (e.g. typically being between 1 m and 10 m), so var_eff may vary between 0 and 100 m$^2$.

In one example, the variance parameter var_eff is set equal to 4 m$^2$ if r_mobile is an ultrasound-derived position estimate, r_mobile_US, that is less than three seconds old, and if r_mobile lies within an error ellipse around r_mobile_BLE defined by three times r_mobile_BLE_spread in each dimension; and is set equal to the lower or 49 m$^2$ and 0.7×(r_mobile_US−r_mobile_BLE)$^2$ in other cases.

P_spatial is a Gaussian function. The exponent and/or exponential term may optionally be further scaled to define P_spatial as a normal distribution, to be a true probability density function; however, this may not be necessary in some embodiments since the P_spatial likelihood values for the transmitter units can still indicate relative likelihood even if they do not sum up to one.

The value of $P\_spatial_i$ for each transmitter unit i in the first shortlist is then compared against a threshold value and those transmitter units that have a P_spatial value below the threshold are filtered out, leaving a potentially reduced shortlist of candidate transmitter units. In some embodiments, a more complex selection criterion may be used, e.g. to additionally filter out at least a minimum percentage of the transmitter units having the lowest P_spatial values.

In some embodiments, the temporal filing 303 and spatial filtering 304 may involve a combined filtering step, optionally in addition to individual filtering, or instead. This combined filtering may comprise calculating a temporal likelihood value, $P\_time_i$, representing a likelihood of each transmitter unit i in the system being the source transmitter unit, based on the time of arrival and the most recent scheduled transmission from that transmitter unit, and by then applying a minimum threshold to the product $P\_time_i \times P\_spatial_i$ to identify a shortlist of candidate transmitter units.

The value $P\_time_i$ may be calculated using a rectangular window of 60 ms duration, with additional symmetric Gaussian tails on both ends; the start of the rectangle may be positioned at the schedule transmission start time for the transmitter unit i, with the value $P\_time_i$ being equal to the value of the windowing function at the time of arrival.

In this way, $P\_time_i$ is at a maximum if the signal is received within 60 ms of its scheduled transmission, and is lower if the signal is received early (possible if there is a clock synchronisation error), or later than this. Of course, a value other than 60 ms may be used, or the P_time function may be defined in any other appropriate way. It may be scaled to be a probability density function (i.e. integrating to one) although this may not be necessary.

The temporal and spatial filtering may be configured always to identify a single most likely transmitter unit, or they may be configured to output a set of likely transmitter units which may contain more than one transmitter unit.

The controller 205 in the mobile device 7 then passes data for the reduced shortlist of candidate transmitter units to a decoder algorithm to applying decoding filtering 305 to identify a source transmitter unit (or potentially more than one likely transmitter units). The decoder may perform a cross-correlation operation on the received signal samples, correlating against stored template data representative of the signature of a transmitter unit in the reduced shortlist. It may do this for each transmitter unit in the reduced shortlist. This is a relatively processing intensive step, so the earlier temporal filtering 303 and spatial filtering 304 serve to reduce the time and power of the decoding step 305. A respective correlation coefficient may be determined for each transmitter unit in the reduced shortlist, which is a decoding likelihood value representing a likelihood of the respective transmitter unit being the source of the received signal, based on the decoding confidence.

The decoding filtering may always select the one transmitter unit having the highest decoding likelihood value to be the identified source transmitter unit, optionally so long as the likelihood value is above a minimum threshold value, or it may potentially select a set of one or more transmitter units having a decoding likelihood above a threshold.

Although some embodiments might combine the temporal, spatial and decoding filtering into a single step (e.g. by multiplying the likelihood values generated by all three steps together, for each transmitter unit in the system), applying the temporal and spatial filtering before starting the decoding step 305 can provide computational benefits.

If a minimum likelihood threshold is applied at any of the temporal, spatial and decoding filtering steps 303-305, that none of the transmitter units meets, the decoding of that signal may be aborted, with the process cycling round to detect the next incoming signal 301.

Assuming one transmitter unit passes through all three filtering steps 303-305, a time-of-flight range value for the signal, based on this transmitter unit being the source of the signal, is added 306 to a buffer of range values, along with the identity or coordinates of the transmitter unit. If more than one transmitter unit passes the filtering, multiple range values may be added 306 to the buffer, assuming each transmitter unit is the source. An associated confidence level may be stored with each range value—e.g. being the product of the temporal, spatial and decoding likelihood values. A time stamp may also be stored—e.g. the time of arrival of the signal. The decoder may be configured to determine a more accurate time of arrival than the energy detector in step 302, e.g. based on a peak location in a cross-correlation operation, which may be used to calculate an updated ToF range value to use in the subsequent positioning algorithm.

A new position estimation for the mobile device 7 is then calculated 307 by solving a geometric minimisation problem (so long as the buffer contains a minimum number of range values—e.g. containing values for at least three different transmitter units 2-5).

In an unsynchronized system, it is not possible to calculate ToF range values, but instead the arrival times of signatures from different transmitter units 2-5 may be buffered and used to solve a minimisation problem based on time-difference-of-arrival TDoA positioning.

The confidence level and age of each buffered range value may be used to weight values differently in the positioning algorithm—e.g. to give more weight to newer and/or more confident range values. Old range data may be discarded from the buffer, or be given a lower weighting based on its age. Similarly, the algorithm may use likelihood information to weight the range data according to a confidence in the accuracy of the assignment of the range to a particular transmitter unit.

The position estimation algorithm solves a linear optimisation problem (e.g. a weighted least-squares regression), relating to the intersection of spheres (or of hyperboloids if using TDOA positioning). The position estimation algorithm solves the optimisation problem to determine a new position estimate. It does this by finding a position that minimises a cost function (i.e. an objective function).

The cost function, J, may take the following form:

$$J(r; r\_tx_i, R\_tof_i) = \frac{\sum w_i\left((r - r\_tx_i)^2 - R\_tof_i^2\right)}{\sum rel\_w_i}$$

where:
r is the new position estimate (in two- or three-dimensional space),
$r\_tx_i$ is the 2D or 3D position of the transmitter unit i, and
$R\_tof_i$ is the most recent time-of-flight range measured between the mobile device and the particular transmitter unit i.

Each transmitter unit i is given a weighting, $w_i$. The weight, $w_i$, may include an absolute component, e.g. which depends on the variance of the measurements for a single transmitter unit i. It may also include a relative component, $rel\_w_i$, which may represent a confidence in the range value for the transmitter unit i relative to the other transmitter units. This confidence may be based on the filtering likelihoods and the age of the most recent range value in the buffer for that transmitter unit. The cost function is normalised for the relative weights, $rel\_w_i$, but not for the absolute weight components. This is because the absolute component (e.g. variance in the measurements) indicates how reliable each transmitter unit is, so should be taken into account globally in the cost function, whereas the relative weights only indicate which transmitter units are trusted more relative to the other transmitter units, not the reliability of the measurements in an absolute sense. In some embodiments, older range values for the same transmitter unit could be included, albeit with a lower weighting due to age.

The new position estimate is then processed 308 as desired. It may be used to control a function on the mobile device 7. It may be communicated to the server 9, e.g. over a BLE link.

The new position estimate may be combined with data from an inertial measurement unit (IMU) or other sensors, such as velocity data or other position estimates. It may be smoothed using previously determined position estimates. It may be input to a Kalman filter module to generate improved position data. This Kalman filter module may combine acoustic-based position estimates with data from other sensors, such as accelerometers, to improve accuracy even further.

The new position estimate (optionally after such post-processing) may be displayed 304 on a map, which could be shown on a screen of the device 7 or of a remote device—e.g. of a client computer connected to the server 9. Of course, this display step is not always required, and the position estimate may be used in other ways instead—e.g. simply being stored in memory for future potential use, or being processed to check if a preconfigured geo-fence has been crossed, or to give audible navigation cues to the user 6, or to display location-dependent advertising on the mobile device 7.

A time series of position estimates $r_n$ may be generated on an on-going basis by looping the process back to the receiving step 301, this time using the latest ultrasound-based position estimate in the spatial filtering 304 (i.e. setting $r\_mobile_n = r_{(n-1)}$ for each iteration n), rather than the initial BLE-based estimate, possibly combined with other sources of information. Because the spread in the successive position estimates $r_n$ should be lower than for the initial BLE-based estimate, the spatial distribution variance var_eff can be set lower, resulting in the number of shortlisted source transmitter units potentially being reduced dynamically. If an error estimate (or confidence value) for the latest ultrasound-based position estimate is available, this may be used in the subsequent spatial filtering 304 step.

There is a risk, when centering each successive spatial filter on an earlier ultrasound-derived position estimates, that a positive confirmation cycle arises that allows significant errors to grow in the tracking. To avoid this, the controller 205 may be configured only to seed each spatial filter with the latest ultrasound-based position estimate if the latest ultrasound-based position estimate, r_mobile_US, is consistent with a recently-obtained BLE-based position estimate, r_mobile_BLE—e.g. if it lies within an error ellipse centred on r_mobile_BLE with size spread_constant× $r_k$_mobile_BLE_spread in each dimension k, where the spread_constant is typically a scalar value in the range one to four and $r_k$_mobile_BLE_spread is a vector representing the uncertainty in r_mobile_BLE in the dimension k. To enable this check to be performed, the mobile device 7 can continue to generate new BLE-based position estimates at intervals, in parallel with tracking the position of the mobile device 7 primarily using received ultrasound signals. If the ultrasound-derived position estimate lies too far away from the BLE-based estimate, the positioning process may set r_mobile equal to the latest BLE-based estimate in the next cycle.

Note that the z height coordinate may be ignored in the above algorithms, since z resolution from indoor BLE RSS signals is typically poor.

Although the steps are shown sequentially here, it will be appreciated that at least some of them may be performed in parallel, e.g. with the output of the microphone 204 being sampled continually to detect new locating signals even as the position estimation algorithm is generating an updated position estimate.

As already noted, the use of BLE, in particular, to help resolve ambiguity in the identity of the source ultrasonic transmitter unit is not essential, and other positioning techniques could be used instead to determine an initial position estimate, such as other radio positioning techniques, or optical positioning, or a user input, or an IMU which has access to a plurality of sensors, including magnetic sensors and/or gyroscopes, etc.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of determining a position estimate for a mobile device, the method comprising:
   receiving a first position estimate for a mobile device;
   receiving an acoustic signal at the mobile device, wherein the acoustic signal is transmitted by one of a plurality of acoustic transmitter units that are each transmitting respective acoustic signals at intervals;
   for each of the plurality of acoustic transmitter units, determining spatial likelihood data representative of a likelihood of the received acoustic signal having been transmitted by the respective acoustic transmitter unit by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;
   using the spatial likelihood data to identify a strict subset of one or more of the plurality of acoustic transmitter units; and
   using information relating to positions of the acoustic transmitter units in the strict subset and/or relating to the acoustic signals transmitted by the acoustic transmitter units in the strict subset when determining a second position estimate for the mobile device;
wherein:
   each acoustic transmitter unit in the strict subset has a higher likelihood of having transmitted the acoustic signal received by the mobile device than at least one acoustic transmitter unit, of the plurality of acoustic transmitter units, that is not in the strict subset; or after the strict subset has been identified, the second position estimate is determined without using information relating to a position of any of the acoustic transmitter units that is not in the strict subset and without using information relating to the acoustic signals transmitted by any of the acoustic transmitter units that is not in the strict subset; or the method further comprises determining the spatial likelihood data for each acoustic transmitter unit by comparing the respective time-of-flight range value with a respective statistical distribution, representative of likelihood against range, that has an expected value equal to the geometric distance value for the respective acoustic transmitter unit.

2. The method of claim 1, wherein each acoustic transmitter unit in the strict subset has a higher likelihood of having transmitted the acoustic signal received by the mobile device than at least one acoustic transmitter unit, of the plurality of acoustic transmitter units, that is not in the strict subset.

3. The method of claim 1, wherein, after the strict subset has been identified, the second position estimate is determined without using information relating to the position of any of the acoustic transmitter units that is not in the strict subset and without using information relating to the acoustic signals transmitted by any of the acoustic transmitter units that is not in the strict subset.

4. The method of claim 1, comprising determining the spatial likelihood data for each acoustic transmitter unit by comparing the respective time-of-flight range value with the respective statistical distribution, representative of likelihood against range, that has an expected value equal to the geometric distance value for the respective acoustic transmitter unit.

5. The method of claim 1, wherein the first position estimate is determined at least in part using one or more electromagnetic or magnetic signals received or transmitted by the mobile device.

6. A positioning system comprising a plurality of acoustic transmitter units, a mobile device, and a processing system, wherein the processing system is configured:

to receive a first position estimate for the mobile device;

to receive data representative of an acoustic signal received by the mobile device from one of the plurality of acoustic transmitter units that are configured to transmit respective acoustic signals at intervals;

for each of the plurality of acoustic transmitter units, to determine spatial likelihood data representative of a likelihood of the received acoustic signal having been transmitted by the respective acoustic transmitter unit by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;

to process the spatial likelihood data to identify a strict subset of one or more of the plurality of acoustic transmitter units; and to process information relating to positions of the acoustic transmitter units in the strict subset and/or relating to the acoustic signals transmitted by the acoustic transmitter units in the strict subset to determine a second position estimate for the mobile device;

wherein the processing system is configured to:

identify the strict subset such that each acoustic transmitter unit in the strict subset has a higher likelihood of having transmitted the acoustic signal received by the mobile device than at least one acoustic transmitter unit, of the plurality of acoustic transmitter units, that is not in the strict subset; or determine the second position estimate, after identifying the strict subset of one or more acoustic transmitter units, without using information relating to a position of any of the acoustic transmitter units that is not in the strict subset and without using information relating to the acoustic signals transmitted by any of the acoustic transmitter units that is not in the strict subset; or determine the spatial likelihood data for each acoustic transmitter unit by comparing the respective time-of-flight range value with a respective statistical distribution, representative of likelihood against range, that has an expected value equal to the geometric distance value for the respective acoustic transmitter unit.

7. The positioning system of claim 6, wherein the mobile device comprises the processing system.

8. The positioning system of claim 6, wherein the processing system is configured to identify the strict subset such that each acoustic transmitter unit in the strict subset has a higher likelihood of having transmitted the acoustic signal received by the mobile device than at least one acoustic transmitter unit, of the plurality of acoustic transmitter units, that is not in the strict subset.

9. The positioning system of claim 6, wherein the processing system is configured to determine the second position estimate, after identifying the strict subset of one or more acoustic transmitter units, without using information relating to the position of any of the acoustic transmitter units that is not in the strict subset and without using information relating to the acoustic signals transmitted by any of the acoustic transmitter units that is not in the strict subset.

10. The positioning system of claim 6, wherein the processing system is configured to determine the spatial likelihood data for each acoustic transmitter unit by comparing the respective time-of-flight range value with the respective statistical distribution, representative of likelihood against range, that has an expected value equal to the geometric distance value for the respective acoustic transmitter unit.

11. The positioning system of claim 10, wherein the processing system is configured to control a variance of the statistical distribution in dependence on any one or more of:

the time-of-flight range value;

data representative of an uncertainty in the first position estimate; and data representative of a difference between the first position estimate when the first position estimate has been determined without using acoustic signals and a position estimate determined using one or more acoustic signals received by the mobile device.

12. The positioning system of claim 6, wherein the processing system is configured to determine temporal likelihood data for each of a second plurality of acoustic transmitter units that are configured to transmit respective acoustic signals at intervals, wherein the temporal likelihood data depends on i) a time of arrival of the received acoustic signal at the mobile device and ii) scheduling data representative of a time of transmission of the acoustic signal by the respective acoustic transmitter unit, but does not depend on a position estimate for the mobile device, and wherein the temporal likelihood data is representative of a likelihood of the received acoustic signal having been transmitted by a respective acoustic transmitter unit.

13. The positioning system of claim 6, wherein the acoustic signals transmitted by the plurality of acoustic transmitter units encode respective identification data for the respective acoustic transmitter unit, and wherein the processing system is configured to decode the received acoustic signal using respective identification data associated with each of the acoustic transmitter units in the strict subset.

14. The positioning system of claim 6, wherein the processing system is configured to determine the second position estimate by solving a geometric optimisation problem involving the positions of one or more of the plurality acoustic transmitter units.

15. The positioning system of claim 6, further comprising an electromagnetic or magnetic transmitter or receiver unit configured to transmit or receive electromagnetic or magnetic signals, wherein the mobile device is configured to receive or transmit the electromagnetic or magnetic signals, and wherein the processing system is configured to determine the first position estimate at least in part using one or more electromagnetic or magnetic signals sent between the electromagnetic or magnetic transmitter or receiver unit and the mobile device.

16. The positioning system of claim 15, wherein one or more of the plurality of acoustic transmitter units comprises a respective electromagnetic or magnetic transmitter or receiver unit configured to transmit or receive electromagnetic or magnetic signals for determining the first position estimate for the mobile device.

17. The positioning system of claim 6, wherein the processing system is configured to determine a succession of two or more position estimates over time, by processing the acoustic signals received by the mobile device, and is configured to determine spatial likelihood data when determining each successive position estimate by comparing a respective time-of-flight range value with a respective geometric distance value that is representative of a distance between a respective acoustic transmitter unit and an immediately preceding position estimate in the succession of the two or more position estimates.

18. The positioning system of claim 6, wherein the received acoustic signals are ultrasonic signals.

19. A non-transitory computer-readable storage medium storing computer software comprising instructions that, when executed by a processing system, cause the processing system:
to receive a first position estimate for a mobile device;
to receive data representative of an acoustic signal received by the mobile device from one of a plurality of acoustic transmitter units that are configured to transmit respective acoustic signals at intervals;
for each of the plurality of acoustic transmitter units, to determine spatial likelihood data representative of a likelihood of the received acoustic signal having been transmitted by the respective acoustic transmitter unit by comparing i) a time-of-flight range value, determined from a time of arrival of the received acoustic signal at the mobile device and scheduling data representative of a time of transmission of an acoustic signal by the respective acoustic transmitter unit, with ii) a geometric distance value, representative of a distance between the respective acoustic transmitter unit and the first position estimate;
to process the spatial likelihood data to identify a strict subset of one or more of the plurality of acoustic transmitter units; and
to process information relating to positions of the acoustic transmitter units in the strict subset and/or relating to the acoustic signals transmitted by the acoustic transmitter units in the strict subset to determine a second position estimate for the mobile device;
wherein the instructions executed by the processing system cause the processing system to:
identify the strict subset such that each acoustic transmitter unit in the strict subset has a higher likelihood of having transmitted the acoustic signal received by the mobile device than at least one acoustic transmitter unit, of the plurality of acoustic transmitter units, that is not in the strict subset; or
determine the second position estimate, after identifying the strict subset of one or more acoustic transmitter units, without using information relating to a position of any of the acoustic transmitter units that is not in the strict subset and without using information relating to the acoustic signals transmitted by any of the acoustic transmitter units that is not in the strict subset; or
determine the spatial likelihood data for each acoustic transmitter unit by comparing the respective time-of-flight range value with a respective statistical distribution, representative of likelihood against range, that has an expected value equal to the geometric distance value for the respective acoustic transmitter unit.

\* \* \* \* \*